March 1, 1932.   E. J. MULLEN   1,847,845
METHOD OF DRYING GASES
Filed Jan. 27, 1928   2 Sheets-Sheet 1
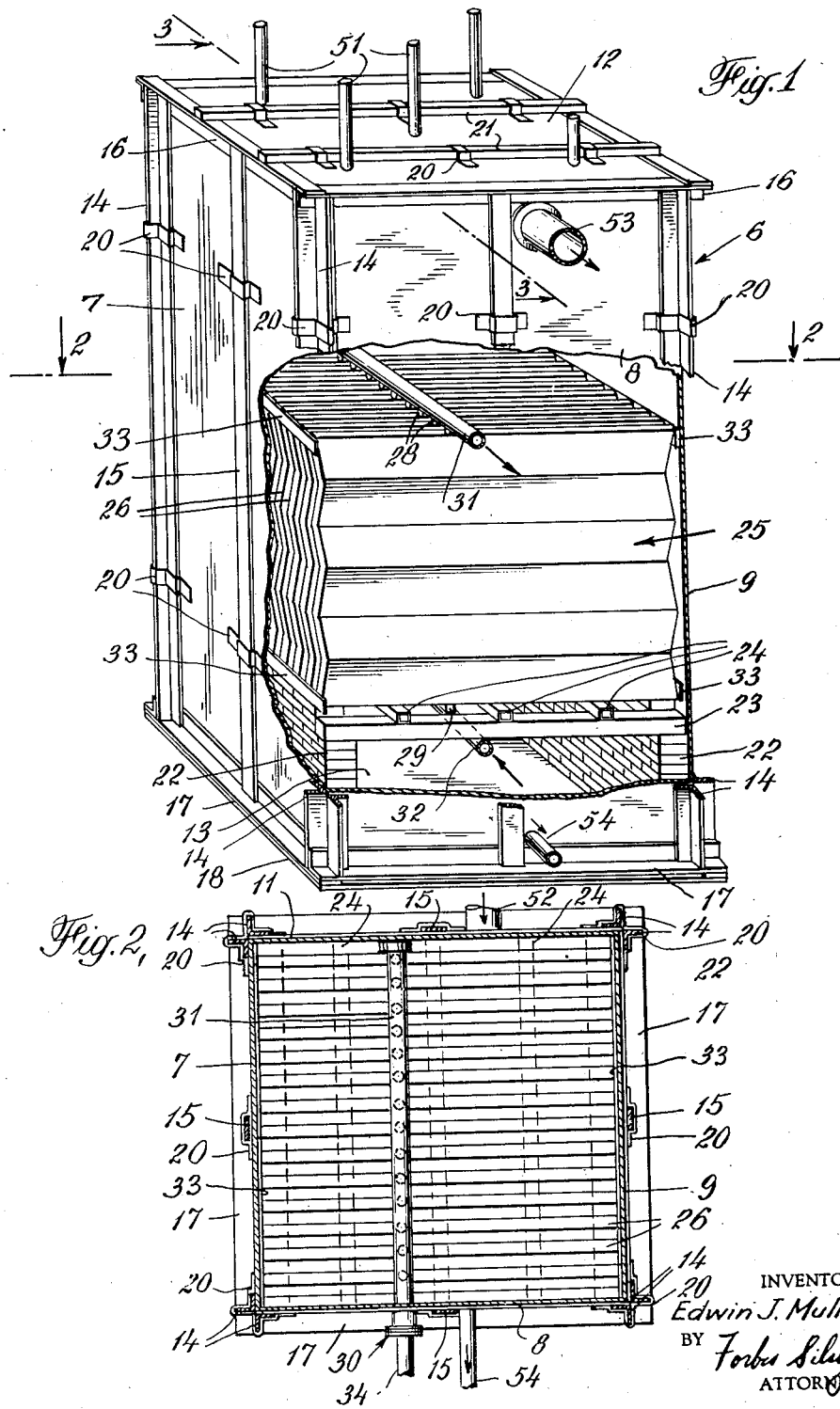
INVENTOR
Edwin J. Mullen,
BY Forbes Silsby
ATTORNEY

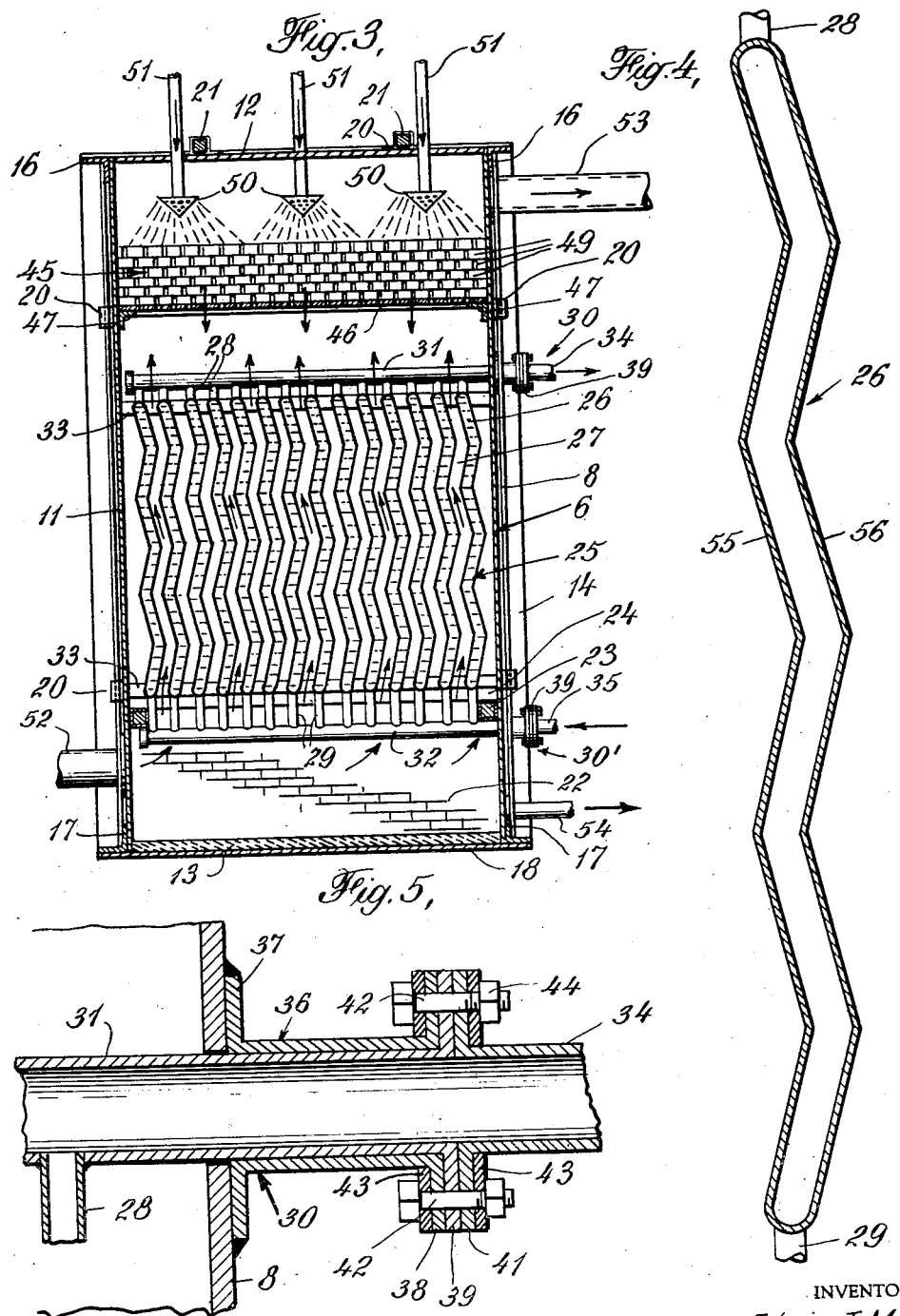

Patented Mar. 1, 1932

1,847,845

UNITED STATES PATENT OFFICE

EDWIN J. MULLEN, OF NEW ROCHELLE, NEW YORK, ASSIGNOR TO GENERAL CHEMICAL COMPANY, OF NEW YORK, N. Y., A CORPORATION OF NEW YORK

METHOD OF DRYING GASES

Application filed January 27, 1928. Serial No. 250,012.

My invention relates to the drying of moist gases, and more particularly to a method and means for abstracting the moisture from such gases by contact with sulphuric acid, and specifically as applied to moist burner gases in the so called "contact" process for manufacturing sulphuric acid.

In the manufacture of sulphuric acid by the contact process the hot burner gases which contain sulfur dioxide, when impure, must be subjected to an essential preparatory treatment prior to their introduction into the catalytic converters where the sulfur dioxide is oxidized to sulfur trioxide.

One of the most important steps in this preliminary preparation of the burner gases is the drying of the same after they have been washed or scrubbed to remove undesirable impurities such as arsenic, etc. which interfere with the catalytic action. Water or dilute sulfuric acid, are the materials commonly used for the gas washing operation, and consequently the washed gases contain material quantities of moisture which must be removed prior to the catalytic conversion.

Heretofore this drying operation has consisted almost invariably in passing the purified gases from the washing or scrubbing tower, up through a drying tower filled with a suitable packing material such as quartz, down through which large amounts of strong sulfuric acid are passed. Through the medium of the packing intimate contact of the moist gases with the strong sulfuric acid is brought about, and the moisture in the gases is abstracted therefrom by the action of the strong acid.

This drying operation is accompanied by the evolution of a very considerable amount of heat and unless provision is made to counteract its effect the temperature will be elevated to a point where effective drying will no longer proceed.

The manner in which this problem has been generally met in the prior practice consists in passing enormous quantities of sulfuric acid through the drying towers to thereby diffuse this heat to such an extent that the drying will not be materially affected, coupled with external cooling of the acid to remove the heat absorbed. For example, in the production of 250 tons of 66° Bé. contact process acid, using the customary drying equipment approximately 5400 tons of 63° Bé. acid must be passed through the drying towers.

The objections to this practice from an efficiency standpoint are obviously many, and not the least of these is the fact that the amount of acid used is so inordinately large that the drying action of a given quantity of the acid is quite small. Hence there is but slight dilution thereof by the moisture abstracted from the gases. In one passage of the acid through the drying tower under the typical conditions noted above, for example, a drop in strength of only ½% $H_2SO_4$ results. This is obviously not efficient from the standpoint of drying accomplished by a given amount of acid.

The object of my invention is to provide a method and means for efficiently abstracting moisture from gases by contact with strong sulfuric acid wherein the heat generated is removed in a novel and efficient manner permitting a very great reduction in the quantity of drying acid required.

I have found that by distributing a film of the concentrated acid over an extensive surface in the interior of the drying tower, contacting the moist gases with said film whereby moisture is abstracted from said gases by said acid film, and cooling said surface whereby the heat generated by the drying operation is removed substantially concurrently with its generation, in amount sufficient to keep the temperature of the acid and gases within limits conducive to effective drying, that I obtain a remarkable enhancement of the efficiency of the drying operation.

When the method and means of my invention are utilized in drying the moist burner gases, a reduction of the amount of acid necessary for the drying process results to an extent that in the past has not been considered possible, and the drying can moreover be accomplished with a greater drop in the strength of the drying acid, thus providing for increased efficiency.

The following specification with its accompanying drawings, illustrates one embodiment of my invention. In the drawings:

Fig. 1 is an isometric projection of a drying tower constructed in accordance with my invention, with parts broken away to show the arrangement of the apparatus in the interior thereof.

Fig. 2 is a horizontal section of the tower taken along the line 2—2, Fig. 1.

Fig. 3 is a vertical section of the same taken along the line 3—3, Fig. 1.

Fig. 4 is a vertical section of one of the cooling chambers embodied in my invention.

Fig. 5 is a vertical section showing in detail the connection of the cooling header.

Referring to the drawings and in particular to Fig. 1, reference numeral 6 designates generally, the casing of a drying tower, said casing comprising walls 7, 8, 9 and 11, top 12 and bottom 13, all constructed of lead or similar material resistant to the action of sulphuric acid. The casing 6 is surrounded by a reinforcing framework constructed of iron or steel members arranged as follows: Angle beams 14 and strips 15 are positioned vertically of the walls of the casing and are connected at their ends to angle beams 16 and 17 constituting respectively top and bottom cross-braces. A base plate 18 is secured to the bottom cross-braces 17 and extends across the bottom 13 of the casing.

Resting upon or secured to the cross-braces 16 are the ends of a number of transverse suspension beams 21. The suspension beams 21, the angle beams 14 and the vertical brace strips 15 are secured to the top and walls respectively of the lead casing by means of lead straps 20 overlying said elements and burned or otherwise secured to the lead casing in any well known manner.

Resting on the lead bottom 13 internally of the casing, is a pair of built-up abutments 22 of suitable acid resisting brick which abutments extend longitudinally of and in contact with the opposite casing walls 7 and 9 respectively. A pair of lead-coated steel bems 23 are supported at their ends in niches at the ends of these abutments, one at each end of the latter, and extending transversely of and supported at their ends by said beams 23 are a series of lead-coated steel cross-bars 24. Upon the grid-like support constituted by these cross-bars and the tops of the two abutments, a drying structure 25 is arranged.

This drying structure 25 extends completely across the interior of the tower as shown in Fig. 2, and is composed of a series of similarly constructed elongated lead cooling chambers 26 of undulated formation, (an enlarged sectional view of one of which is shown in Fig. 4) which chambers are mounted in closely-spaced relation to provide a series of narrow, tortuous passages 27, (Fig. 3) one between each pair of adjoining chambers for the joint passage of the drying acid and gas. At the upper and lower ends respectively of each lead chamber 26, lead nipples 28 and 29 are provided which are burned to the chamber and to the respective lead headers 31 and 32, by means of which connections a cooling medium may be distributed through the chambers.

The bottoms of the chambers 26 rest upon the cross-bars 24 and the tops of the abutments 22, and the bottom header 32 extends below these supporting elements.

To assist in maintaining the chambers in properly spaced relation, lead-coated steel brace plates 33 are burned to the lead chambers adjacent their tops and bottoms at the sides thereof.

The headers 31 and 32 extend through the wall 8 of the casing at the cooling medium outlet 30 and inlet 30' respectively as shown in Fig. 3 and their projecting ends are connected with discharge and feed pipes 34 and 35 respectively. Pipe 35 connects in turn with a supply of cold water or other cooling medium, the circulation of which upwardly through the chambers 26 of the drying structure 25 is maintained by suitable pumping means (not shown).

The manner in which the headers are connected to the discharge and feed pipes is as shown for header 31, in Fig. 5. A lead collar 36 having flanged ends 37 and 38 is closely fitted around the portion of the header which extends externally of the casing wall 8, and said collar is burned or otherwise secured to said wall at its end 37. Over the flanged outer end 38 of this collar the header end is turned as at 39, and a flange 41 on the end of a discharge pipe 34 abuts against the turned end 39, forming a composite flange structure, which structure is held together by threaded bolts 42. Iron or steel reinforcing rings 43 are interposed respectively between the heads of these bolts and the adjoining lead flange 38 and between the securing nuts 44 and the flange 41, to lend stability to the structure. The flanged collar 36 may, if desired, be provided in the form of an integral extension of the wall 8 of the casing.

As best shown in Fig. 3, an acid-resistant distributing structure 45 is provided at a point above the top of the drying structure 25 to distribute the acid uniformly thereto. This distributing construction comprises a perforated cast iron base plate 46 which is supported by a number of lead-covered steel brackets 47 burned to the casing and optionally to the plate, and upon the base plate are arranged several layers of acid-resistant tile 49, such, for example, as the well-known spiral tile. Closely adjoining the upper surface of this tile packing are a number of acid sprays 50, to which sprays the strong acid is pumped through lead inlet pipes 51 in any well-known manner.

In the wall 11 of the casing at a point directly below the bottom of the drying structure 25, a gas inlet 52 is provided and in the opposite wall 8 of the tower at a point adjoining the top thereof is a gas outlet 53 for the dried gas, which outlet preferably leads to a coke or other filter of any well-known type, to remove acid which may be mechanically suspended in the gas leaving the tower. An acid outlet 54 is provided in the wall 8 at a point slightly above the bottom 13 of the casing, for conducting away the diluted acid after the drying operation, which acid may be restrengthened (by the addition of 98% $H_2SO_4$ for example), cooled, and reintroduced into the tower.

In Fig. 4 I have shown on a somewhat enlarged scale a vertical sectional view of one of the lead chambers embodied in my invention. The walls 55 and 56 of this chamber are constructed to provide undulated surfaces so that when a series of these chambers are arranged in spaced relationship as shown in Fig. 3, a series of tortuous passages will be provided between the adjoining undulated walls.

The operation of my invention is substantially as follows: Cool, strong sulphuric acid (for example 63° Bé. acid) is introduced through the inlet pipes 51 and is distributed by the sprays 50 over the surface of the spiral-tile packing 49, which packing, in conjunction with the perforated plate 46, serves to disperse the acid so that it is supplied more or less uniformly over the top of the drying structure 25 therebeneath.

By cool, strong sulphuric acid, I mean acid at such a temperature and of such strength that it will abstract moisture to the necessary degree from the moisture-laden gases with which it is brought in contact. It is obvious that a fairly extensive range of acid strength is permissible with an appreciably low temperature of the same; but for all practical purposes it is preferable to use acid of a strength of at least 60° Bé. (approximately 78% $H_2SO_4$).

Meanwhile, a stream of a suitable cooling medium, such as cold water, is pumped through the lead cooling chambers 26 of the drying structure, which medium is introduced through the header 32 and withdrawn through header 31.

Upon reaching the drying structure, the acid will be divided among and will flow downwardly through the tortuous narrow passages 27 constituted by the walls of the spaced lead chambers 26, and by reason of the construction of these passages and the amount of acid fed thereto, the down-flowing acid will be presented substantially as a series of films whose direction of flow is repeatedly varied laterally by the undulated surface of the chamber walls 55, 56 over which they pass.

Simultaneously with the flow of the acid films through the drying structure the moist burner gases are introduced by the pressure of the blowers in the usual contact process system through the gas inlet 52, whence they pass upwardly through the tortuous narrow passages 27 in the drying structure and come in intimate and turbulent contact with the films of drying acid descending therethrough. When the moist gases and the concentrated acid come together, a very considerable quantity of heat is evolved as hereinbefore noted, but by virtue of the cooled surface of the lead chambers over which the films of acid are passing, this heat will be removed from the acid and the gas to the extent desired practically as soon as generated or within a very short period thereafter, that is, substantially concurrently with its generation in the drying operation rather than at such a prolonged interval thereafter that the operative temperature will have been injuriously exceeded prior to the cooling. It is obviously not essential that all the heat generated by the drying operation be removed. It is enough that a sufficient amount of such heat is removed to maintain the temperature for the drying operation within limits conducive to effective practical drying, i. e. operative limits. These limits will depend upon the acid concentration and temperature, gas temperature and moisture content, extent of drying desired and various other factors as well understood in the art, and when determined for the particular operation can be readily maintained by proper regulation of the temperature and rate of flow of the cooling medium, etc.

In their passage through drying structure 25, and to a lesser extent through the distributing packing 45, the gases will be thoroughly dried and will pass off through the gas outlet 53. From the outlet 53 the gases may be conducted to a coke filter for removing such acid as is swept off in the gases. The diluted acid passes downwardly to the bottom 13 of the chamber and is run off through the acid outlet 54 whence it is conducted away for restrengthening and cooling prior to its further use in the drying operation.

While the acid films are in practically continuous contact with the cooled surfaces of the walls of their respective passages, it is obvious that such contact could as well be intermittent as long as the heat being generated is removed from the acid with sufficient frequency and in such amount to keep the temperature within the limits at which the desired drying will proceed effectively.

Moreover, the entire drying surface need not be subjected to cooling to yield the desired results. A slight drying action will take place in the passage of the gas through the minor drying structure constituted by the acid-charged distributing packing 45 for example, in addition to the major drying in the main drying structure 25, but for all practical purposes, as long as the major portion of the aggregate drying surface is cooled, whereby heat is abstracted from the major portion of the acid, the temperature can, by proper regulation of the temperature and flow of the cooling medium, be readily maintained within effective limits.

In the embodiment of the invention shown in the drawings it will be apparent that the surface area of the water-cooled chambers 25 plus the area of the side walls of the casing 6 (which will be cooled by radiation) is considerably greater than that of the packing 45. Thus the area of cooled drying surface constitutes not less than the major portion of the total drying area within the tower.

An example of a state of conditions under which my method and apparatus will effectively operate, is as follows:—

Leaving the scrubbers in the contact process system at a temperature of about 80° F., in which scrubbers the burner gases have been washed with water or dilute sulfuric acid, for example, the burner gases, with a moisture content substantially equal to their saturation limit at that temperature, are continuously introduced into my drying tower through the gas inlet 52. Prior to the introduction, a flow of 82% sulfuric acid at a temperature of 95° F. has been started in the drying tower and the volume of acid and period of contact of the same, with the moist gases, is so regulated that a dilution to 79% acid occurs, with an acid exit temperature of 115° F. After leaving the drying tower, the 79% acid is restrengthened with 98% acid, with concurrent or subsequent cooling, to again obtain 82% acid at 95° F., which acid is reintroduced into the drying tower. The dried gases leaving the tower will have a temperature of roughly 95° F.

When my invention is practiced in accordance with the principles herein disclosed, or with such alterations or regulations as would be obvious to one skilled in the art, the advantages which will result therefrom are numerous and of considerable importance. The major advantage which proceeds from the use of the method and apparatus of my invention, is the substantial reduction thereby made possible in the amount of sulphuric acid heretofore necessary to effect suitable drying; with its consequent power saving in the acid pumping operation, decrease in apparatus destruction, etc.

A further consideration of some moment is the acceleration of the operation made possible by the substantial elimination of the cumbersome and retarding action of the usual packing material.

While I have disclosed a preferred embodiment of the method and apparatus of my invention, it is to be understood that I do not consider myself to be limited specifically to the embodiment disclosed; but that my invention contemplates all such equivalent embodiments and applications as fall within the following claims.

I claim as my invention:

1. The method of abstracting moisture from gases by contact with a body of strong sulfuric acid which comprises distributing the body of drying acid in film form on one side of an extended drying surface, contacting the moist gases with the film of said acid to dry said gases, and passing cooling fluid in contact with not less than a major portion of the opposite side of said surface, whereby heat generated by the drying operation is removed from the film substantially as generated therein.

2. The method of abstracting moisture from gases by contact with a body of strong sulfuric acid which comprises distributing the body of drying acid in the form of a continuous film on one side of an extended drying surface, contacting the moist gases with the film of acid to dry the gases, cooling the opposite side of the surface by a fluid cooling medium substantially concurrently with the contacting of the gases and the body of the acid constituting the film, and maintaining the coacting relation of the gases, the body of drying acid and the cooling medium substantially continuously throughout the drying operation, whereby the gases are dried and the heat removed substantially as generated.

3. The method of abstracting moisture from gases by contact with a body of strong sulfuric acid which comprises distributing the body of drying acid in film form on one side of an extended drying surface, contacting the moist gases with the film of acid to dry the gases, and cooling the opposite side of the surface with an extraneous cooling fluid throughout substantially the entire area of the surface, whereby heat generated by the drying operation is removed from the film substantially as generated therein.

4. The method of abstracting moisture from gases by contact with strong sulfuric acid which comprises forming a film of drying acid on one side of an extended, undulated metallic drying surface, contacting the moist gases with the film of acid to dry the gases, and cooling the opposite side of the surface with an extraneous cooling fluid in contact with not less than a major portion of the surface, whereby heat generated by the drying operation is removed from the film substantially as generated therein.

5. The method of abstracting moisture from gases by contact with strong sulfuric acid which comprises passing drying acid in the form of films over the walls of a multiplicity of confined passageways, passing moist gases through said passageways in contact with the films, and cooling the opposite sides of the walls of the passageways with an extraneous cooling fluid, whereby heat generated by the drying operation is removed from the films substantially as generated therein.

6. Apparatus for abstracting moisture from gases by contact with drying liquid which comprises means for distributing drying liquid in the form of films over the walls of a multiplicity of confined passageways, means for passing gases through said passageways in contact with said liquid in said passageways, and means for cooling the opposite sides of the walls of said passageways with an extraneous cooling fluid, whereby heat generated by the abstraction of moisture from said gases by said liquid is removed by said cooling fluid.

7. The method of abstracting moisture from gases by contact with a body of strong sulfuric acid which comprises distributing the body of drying acid in film form on one side of an extended drying surface, contacting the moist gases in countercurrent flow with the film of acid to dry the gases, and cooling the opposite side of the surface with an extraneous cooling fluid throughout substantially the entire area of the surface, whereby heat generated by the drying operation is removed from the film substantially as generated therein.

8. In an apparatus for abstracting moisture from gases by contact with drying liquid, a casing, horizontally elongated cooling chambers arranged within said casing extending vertically throughout a major portion of said casing and disposed in closely adjoining relation whereby a narrow passage is defined between the respectively adjoining walls of said chambers, means for introducing drying liquid into said passage, means for introducing gases into contact with said liquid in said passage, and means for introducing a cooling medium into said chambers for cooling the walls defining said passage whereby heat generated in said passage by the abstraction of moisture from said gas by said liquid is removed from said passage by said cooling medium.

9. In an apparatus for abstracting moisture from gases by contact with drying liquid, a casing, cooling chambers arranged within said casing, said chambers being constructed and arranged to provide a plurality of narrow tortuous passages therebetween, and the external area of said chambers being not less than a major portion of the drying area within said casing, means for introducing drying liquid into said passages, means for introducing gases into contact with said liquid into said passages, and means for introducing a cooling medium into said chambers, for cooling the walls thereof whereby heat generated in said passages by the abstraction of moisture from said gas is removed from said passages by said cooling medium.

10. In an apparatus for abstracting moisture from gases by contact with drying liquid, a casing, a pair of horizontally elongated walls having undulated surfaces arranged within said casing in closely spaced relation whereby a narrow, tortuous passage is defined between said walls, means for passing a film of drying liquid through said passage in contact with the undulated surfaces defining said passage, means for passing gases into contact with the liquid in said passage whereby moisture is abstracted from said gases by said acid, and means for contacting a cooling medium with said passage-defining walls externally of said passage whereby heat generated in said passage by the drying action of said liquid is removed therefrom by said cooling medium.

11. In an apparatus for abstracting moisture from gas by contact with drying liquid, a casing having a liquid inlet and a liquid outlet disposed at opposite ends of said casing, and a gas inlet and a gas outlet disposed at opposite ends of said casing, a drying structure mounted within said casing intermediate said oppositely disposed liquid and gas inlets and outlets respectively and extending substantially entirely across the interior of said casing, said structure comprising a series of elongated undulated chambers arranged in closed spaced relation whereby a series of tortuous, narrow passages are provided between adjoining chambers for the joint passage of liquid and gas, a cooling medium inlet in said casing, a cooling medium outlet in said casing, and a plurality of means connecting the chambers of said drying structure with said last named inlet and outlet respectively whereby a cooling medium may be passed through said chambers to cool said passages.

12. In an apparatus for abstracting moisture from gas by contact with drying liquid, a casing having a liquid inlet and a gas outlet at its upper end and a liquid outlet and a gas inlet at its lower end, a drying structure mounted within said casing intermediate said acid and gas inlets and outlets respectively and extending substantially entirely across the interior of said casing, said drying structure comprising a series of vertical, elongated, undulated chambers arranged in close, horizontally spaced relation whereby a series of tortuous, narrow passages extending from top to bottom of the drying structure is provided between adjoining chambers for the joint passage of liquid and gas, a cooling medium inlet in said casing, a cooling medium outlet in said casing, and a plurality of means connecting said chambers with said last named inlet and outlet respectively whereby a cooling medium may be passed through said chambers to cool said passages.

In testimony whereof I affix my signature.

EDWIN J. MULLEN.